United States Patent [19]

Mennink

[11] Patent Number: 5,738,023

[45] Date of Patent: Apr. 14, 1998

[54] COMBUSTION APPARATUS WITH GAS FILTERING AND HEAT EXCHANGING MEANS

[76] Inventor: Bernhardt Diedrich Mennink, Coehoornsingel 76, NL-7201 AE Zutphen, Netherlands

[21] Appl. No.: 501,012

[22] PCT Filed: Feb. 11, 1994

[86] PCT No.: PCT/NL94/00035

§ 371 Date: Sep. 29, 1995

§ 102(e) Date: Sep. 29, 1995

[87] PCT Pub. No.: WO94/18508

PCT Pub. Date: Aug. 18, 1994

[30] Foreign Application Priority Data

Feb. 12, 1993 [NL] Netherlands ............... 9300282

[51] Int. Cl.$^6$ .................................... F23C 9/00
[52] U.S. Cl. .................... 110/216; 110/265; 110/309
[58] Field of Search ................... 110/216, 265, 110/309

[56] References Cited

U.S. PATENT DOCUMENTS

| | | |
|---|---|---|
| 3,903,694 | 9/1975 | Aine ............................. 60/274 |
| 4,242,972 | 1/1981 | Sicard ........................... 110/216 |
| 4,443,183 | 4/1984 | Shimizu et al. ................ 431/354 |

FOREIGN PATENT DOCUMENTS

| | | |
|---|---|---|
| 0230193 | 7/1987 | European Pat. Off. . |
| 230193 | 12/1986 | France ...................... 110/309 |
| 2636129 | 3/1990 | France . |

*Primary Examiner*—Henry A. Bennett
*Assistant Examiner*—Gregory A. Wilson

[57] ABSTRACT

The invention relates to an apparatus for burning fossil fuel, for instance oil, gas, coal, biogas formed from organic waste, or the like, which apparatus comprises combustion means for burning this fuel in addition to converting means for converting the energy becoming available in this combustion into a desired form of energy, for instance a burner which can transfer the combustion heat to a heat exchanger for heating of heating medium, air or mains water, which apparatus further comprises a supply conduit for combustion air and a discharge conduit for flue gases. In order to increase the efficiency of such an apparatus the apparatus according to the invention has the special feature that the supply conduit for outside air and the discharge conduit for flue gases are mutually communicating via a water vapour and heating exchanging system such that at least a part of the water vapour present in the flue gases is transferred to the incoming combustion air, with the vapour pressure difference between both substance flows as driving force for the water vapour exchange.

4 Claims, 5 Drawing Sheets

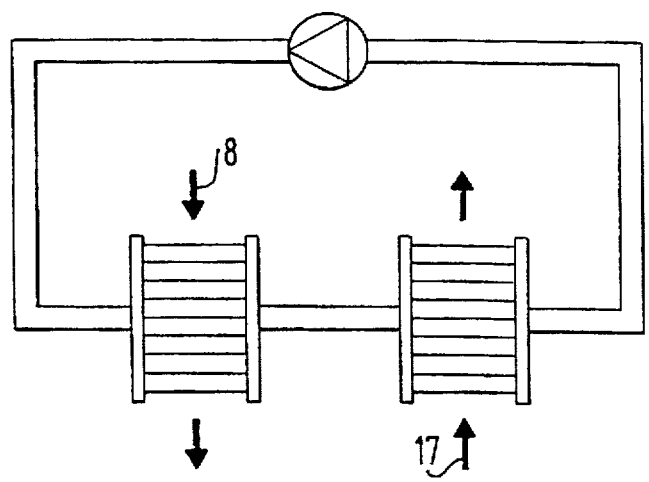
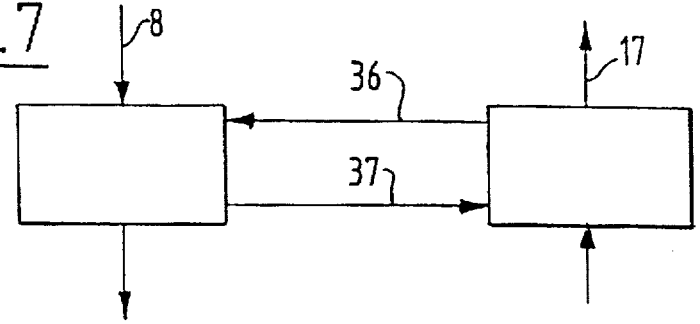
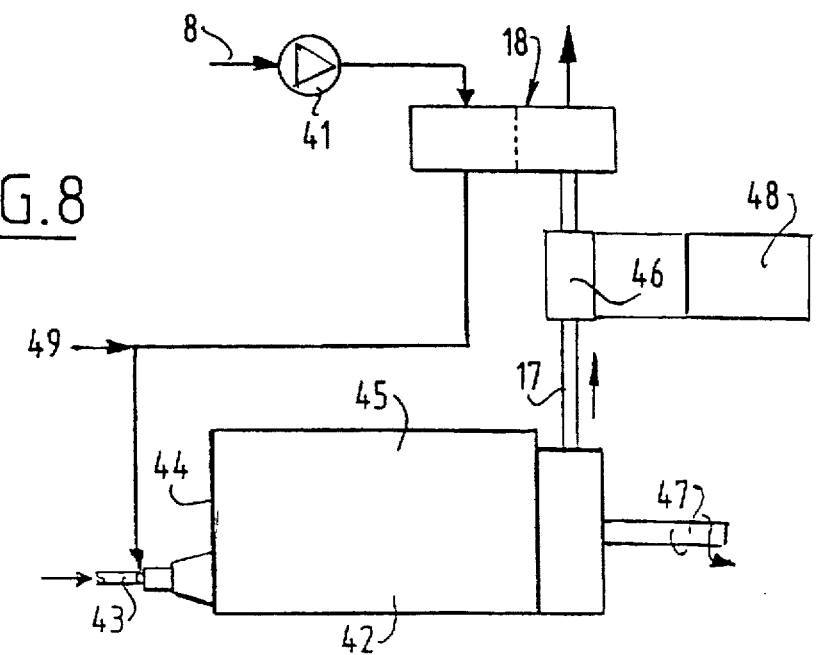

COMBUSTION APPARATUS WITH GAS FILTERING AND HEAT EXCHANGING MEANS

BACKGROUND OF THE INVENTION

1. Field of the Invention

The invention relates to an apparatus for burning fuel, for instance oil, gas, coal, biogas formed from organic waste, or the like in which the apparatus comprises a combustion means for burning this fuel in addition to a converting means for converting the energy becoming available during this combustion into heat, cold or into a combination of thermal energy with power. For instance, a burner which can transfer the combustion heat to a heat exchanger for heating of a heating medium, such as air, tap water, or a combustion motor, for the purpose of heat/power generation, in which the apparatus further comprises a supply conduit for combustion air and a discharge conduit for flue gases.

2. Description of the Prior Art

Such an apparatus is known in diverse embodiments, for instance, heating furnaces for heating room areas either indirectly via water as heating medium or by direct heating of air, for private use or for professional purposes, for heating of tap water and the like.

Another example of such an apparatus is a thermally driven absorption heat pump or cooling installation for heating and/or cooling purposes.

Yet another example of such an apparatus is a heat/power installation, wherein the heat from the cooling water and the flue gases is used for heating purposes and the power is used to generate electricity by means of a generator or to drive one or more heat pumps.

The object of the invention is to provide an apparatus which is adapted relative to the prior art such that its efficiency is considerably increased.

Forming the basis of the invention to be described hereinafter is the insight that it is possible to increase the efficiency of known apparatus by reducing the latent and sensible enthalpy in the flue gases of such a known apparatus.

It is known that for instance the flue gas of natural gas-fired heating furnaces contains considerable amounts of so-called latent energy in the form of water vapour. In gas-fired, non-condensing so-called "improved efficiency furnaces", wherein the flue gas has a temperature between 130° C. and 230° C., the loss of latent heat content via the flue gases amounts to roughly 9.5% and of sensible heat content is between 6% and 9%. The total efficiency of these furnaces lies between 80% and 85%. At an air excess of 10% each 10K temperature fall in flue gas of non-condensing furnaces implies an increase in efficiency of about 0.5%.

The energy yield of gas-fired heating furnaces can thus be considerably increased by further cooling of the flue gas to below the dew-point of the flue gases. This dew-point depends on the air excess that is applied. At an air excess of for instance 1.27 the dew-point lies at roughly 53° C.

Such condensing heating installations which, when properly embodied, have using efficiencies of over 90% of the upper calorific value of natural gas are called high efficiency (HE) installations. The desired temperature decrease of the flue gases is achieved by enlarging the heat exchanging surface between the flue gases and the medium to which heat is relinquished. In central heating systems for house heating an additional so-called flue gas condenser was originally added for this purpose to the already present heat exchanger, and later both were integrated into one heat exchanger. The low temperature of the flue gases also required an additional flue gas vent for discharge of these gases.

A drawback of this known method is that the efficiency gain to be made in this manner is limited and greatly determined by the installed heating surface, because condensation of the flue gases only occurs at a return water temperature lower than 50° C., and the installed heating surface in dwellings is designed at a feed/return water temperature usually of 90/70° C. at maximum heat demand. The actual return water temperature will thus lie above the dew-point temperature for a considerable part of the heating season, wherein no condensation therefore occurs and efficiency lies between 80 and 86%. For Central European conditions a seasonal efficiency of only about 90% is therefore achieved.

SUMMARY OF THE INVENTION

In view of the above, the apparatus according to the present invention has a gas separating membrane including a gas separating layer facing the flue gases and as part of a water vapour and heating exchanging system adapted for exchanging heat between the combustion air and the flue gases. Preferably, the apparatus has a gas separating layer comprised of polydimethylsiloxane. It is also preferable that the gas separating layer is applied to a microporous carrier comprised of a polysulfon.

An even greater increase in efficiency is obtained with an apparatus which has the special feature in which additional humidified combustion air is fed into the water vapour exchanging system. This additional moist air flow can come from elsewhere in the vicinity and be added to the combustion air humidified by the water vapour exchanging system. Both air flows are supplied jointly to the combustion apparatus.

The apparatus according to the invention can, in addition to the above stated burner, also used for instance in a combustion motor for combined generation of heat and mechanical energy. In all cases the heat is preferably used below a temperature of about 82° C. for reasons which will later become apparent, particularly with reference to FIG. 2.

BRIEF DESCRIPTION OF THE DRAWINGS

The invention will now be elucidated with reference to the annexed drawings. In the drawings:

FIG. 5 shows another type of water vapour exchanger in a highly schematic view;

FIG. 7 is a simple block-diagrammatic view of the moisture recirculation making use of a gas absorption membrane; and FIG. 8 shows a simple block-diagrammatic view of an energy generating device for heat, cold or heat/power.

DESCRIPTION OF THE PREFERRED EMBODIMENTS

Figure 1:
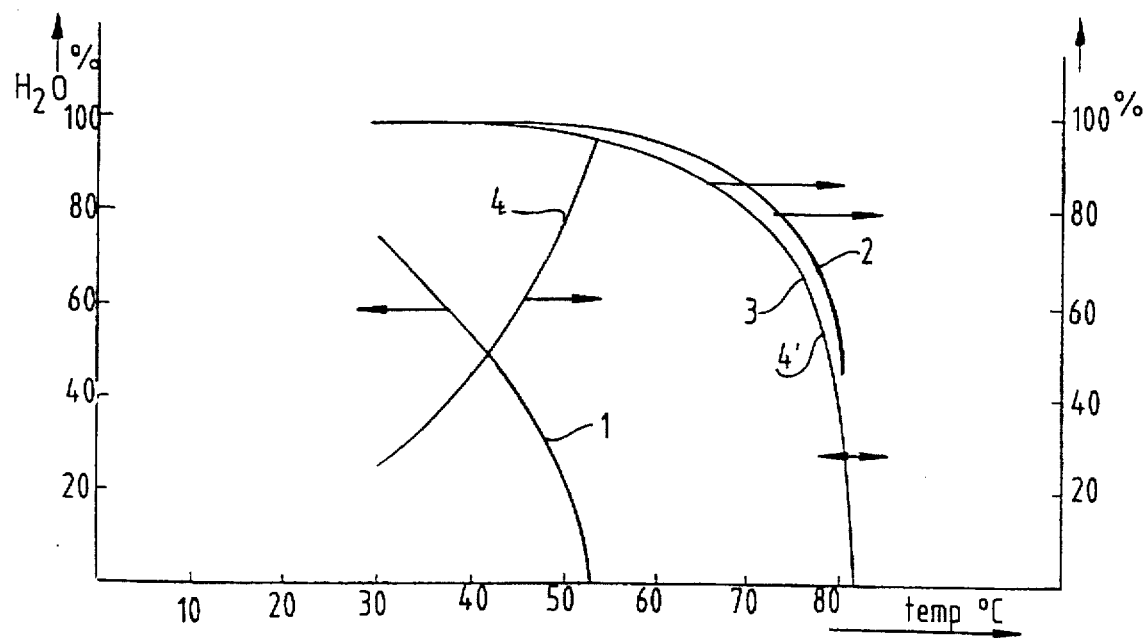
FIG. 1 shows graphs in which the condensate percentage of the chemically formed water and the condensate gain relative to a known high efficiency furnace are shown as a function of the flue gas temperature.

In FIG. 1 two quantities are plotted against the flue gas temperature, expressed in °C. The left-hand vertical axis shows the condensate as a percentage of the chemically formed water, while the right-hand vertical axis relates to the condensate gain compared to a high efficiency furnace according to the prior art at an air excess of 1.27. In this respect reference will also be made hereinafter to FIG. 2. In the graphs are drawn arrows to the left and to the right. These arrows indicate to which quantity the relevant graph relates. Line 1 relates to the efficiency of a condensing high efficiency furnace of the prior art with supply of dry combustion air. Line 2 refers to an apparatus according to the invention with an air excess of 1.1 and an isothermic moisture extraction from the flue gases of 90%. Line 3 likewise relates to an apparatus according to the invention, but now with an air excess of 1.27, likewise with a moisture extraction percentage from the flue gases of 90%. Line 4 shows the difference between lines 3 and 1. It is noted in this respect that line 1 intersects the horizontal axis at a temperature of about 53° C., so that at this temperature line 4 coincides with line 3. From that point the graph 4 can be seen as continuing along the line 3, which for this purpose also carries the indication 4'.

The great dependence of the extent of condensation and thus of the efficiency on the flue gas temperature is illustrated in FIG. 1, which shows, at a determined air excess and as a function of the flue gas temperature, the amount of condensate as a percentage of the amount of chemically formed water vapour.

This strong dependence of the energy efficiency on the flue gas temperature and thus on the water temperature is typical of condensing heating installations and does not occur in non-condensing heating installations such as for instance in so-called improved efficiency (IE) heating installations.

Figure 2:
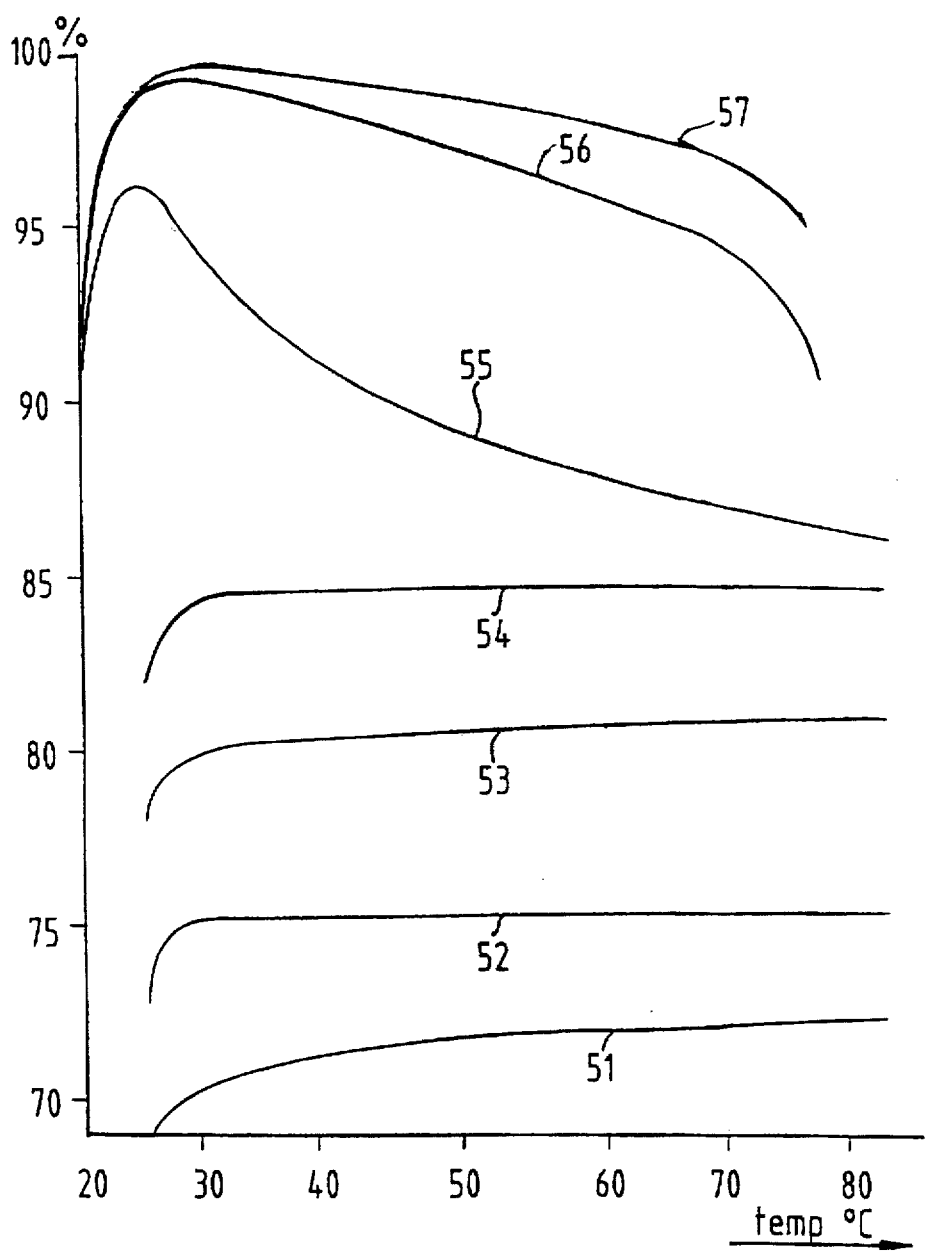
FIG. 2 shows a graph in which the efficiency of six different central heating furnaces, including a furnace according to the invention is shown as a function of the average water temperature.

FIG. 2 shows the efficiency of six different types of heating furnaces of the 90/70 system as a function of the average heating water temperature. All furnaces are measured under the same conditions.

The bottom line 51 relates to an older central heating furnace, that is, a furnace from before about 1981.

The following line 52 relates to a comparatively modern central heating furnace, that is, a furnace from after about 1981.

The following line 53 relates to a normal furnace of the type with improved efficiency.

The following line 54 relates to a so-called furnace of the type with super-improved efficiency.

The following line 55 relates to a condensing high-efficiency furnace of a type supplied by applicant.

The following line 56 relates to a furnace according to the invention without further cooling of flue gases but with improved condensation.

The top line 57 relates to a furnace according to the invention with improved condensation and simultaneous cooling of the flue gases.

According to FIG. 2, the line 55, for HE furnaces at 10° C. higher water temperature the efficiency is in the order of 1% lower at temperatures above 50° C. to 2–3% at lower temperatures. It can also be seen that the efficiency of heating installations of the type with improved efficiency is practically constant. The drawback of a limited efficiency for room area heating applies to an even greater extent for mains water heating wherein no condensation at all occurs. In so-called HE combi-furnaces wherein mains water heating is provided by a hot-water storage furnace heated indirectly via the HE furnace, appliance efficiencies of only about 60% are achieved. Since the energy consumption for mains water heating rises relatively when compared to room heating as a result of the increasing degree of insulation of dwellings, steps to increase the efficiency for mains water heating are becoming of increasingly greater importance.

Other drawbacks to the present HE heating installations are:

1) In respect of the low temperature of the vapour-saturated flue gases, condensation water is formed in the outlet system. This aggressive water can have an adverse effect on brickwork outlet ducts. In order to prevent this expensive metal flue pipes must be placed in such ducts. In order to prevent this, HE heating Installations are often placed in attics, wherein use is made of separate plastic roof ducts;

2) when there is frost, dangerous ice formation may occur on the outlet or chimney wherein this can break off and there exists in any case the danger of falling lumps of ice;

3) a visually disturbing condensation plume and, in the case of horizontal wall ducts, a possible adverse effect on surrounding materials by the condensation.

In order to obtain a better heat recovery it would seem self-evident to cause the in and outgoing air flows to heat exchange with each other in counterflow. The enthalpy absorption capacity of the ingoing air flow is however too small in relation to the enthalpy decrease of the flue gases as soon as condensation occurs in the heat exchanger. Example: a fall in the temperature of a quantity of flue gas from 60° C. to 5° C. resulting from the combustion of 1 m$^3$ natural gas with an air excess of 1.27 releases about 690+5000=5690 kJ sensible plus condensation heat, while the cold ingoing air flow, when heated from 5° C. to 60° C., can only absorb 740 kJ or about 13%. The absorption capacity of the ingoing air is thus too small for a good heat recovery.

The invention is based on the insight that a much better heat recovery is possible if the dew-point temperature of the flue gases were successfully increased in the combustion space to above the return water temperature. This should take place by bringing about, in an apparatus or exchanger, moisture and heat exchange, if possible simultaneously, between the combustion air and the flue gas in counterflow. For a good heat and moisture transfer the dividing wall between both air flows in this apparatus must possess the following properties:

1. a large contact surface
2. a low thermal resistance
3. a large permeability to water vapour compared to other components in the air flows.

Figure 3:
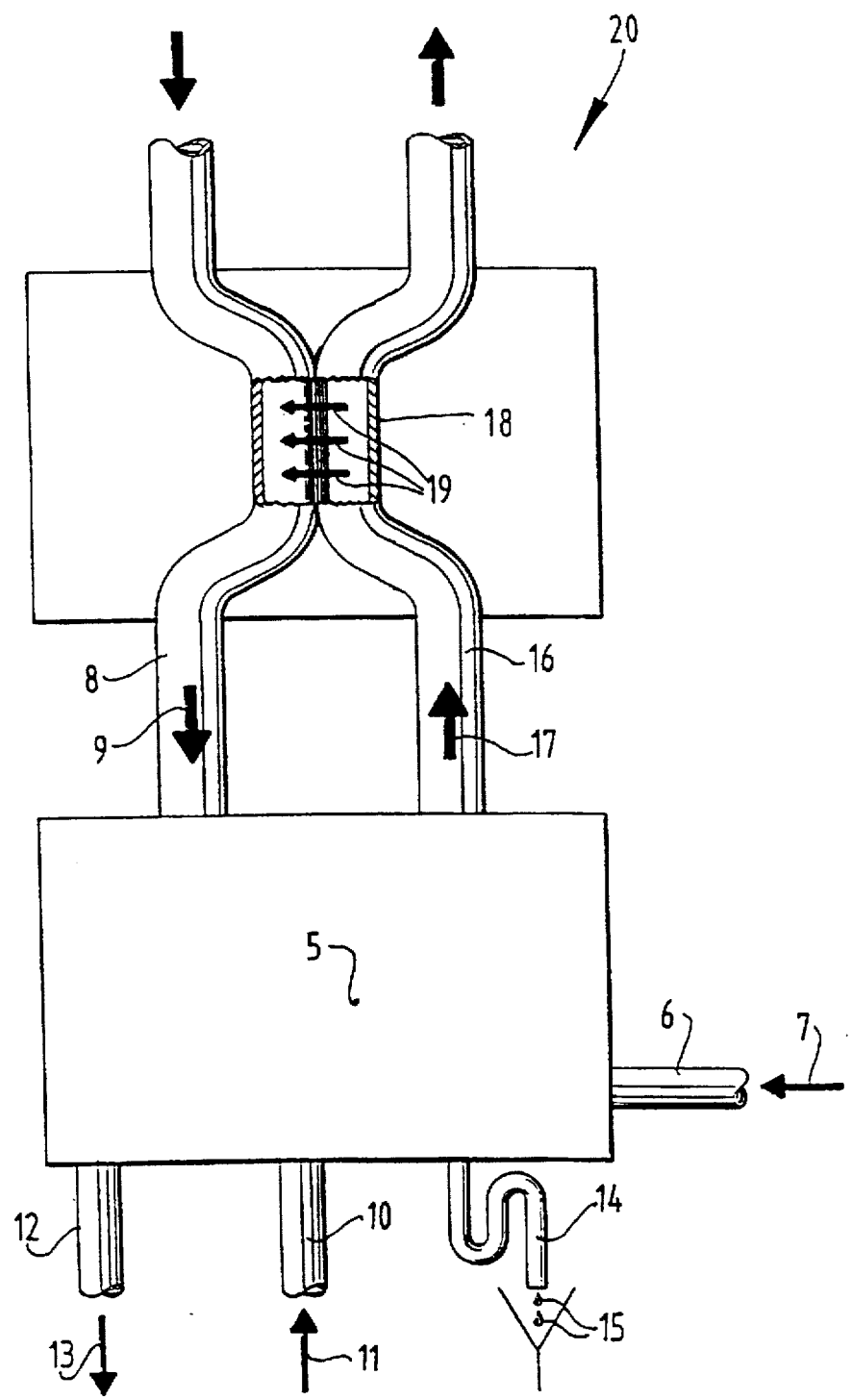
FIG. 3 shows a very schematic view of an apparatus according to the invention.

FIG. 3 shows a heating furnace 5 which via a gas feed pipe 6 receives combustion gas 7. Via an air feed pipe 8 an internal burner also receives combustion air 9. The burner (not drawn) can heat water 11 received via a feed pipe 10 and deliver heated water 13 via an outlet pipe 12. The heating furnace 5 is of the condensing type. Condensation 15 can be discharged via a drain pipe 14. Heated and water vapour-containing flue gases 17 can be discharged via a flue gases outlet pipe 16. Situated between the air feed pipe 8 and the flue gases discharge pipe 16 is a membrane module 18 which can extract water vapour from the flue gases 17 and supply it to the combustion air 9. The water vapour transport is indicated with arrows 19. Heat exchange between the flue gas and the combustion air also takes place in the membrane module 18 simultaneously with the moisture exchange if the combustion air is supplied at a lower temperature than the flue gas temperature.

In this apparatus 20 little or no condensation will take place in either air duct if the temperature change keeps pace with the humidity change. Should condensation nevertheless occur, the released heat will not be wholly lost but partly contribute to heating of the combustion air. The driving forces behind heat and moisture exchange are the temperature difference and the vapour pressure difference between both air flows at any moment during passage through the apparatus.

It can be easily appreciated that the moisture content of the combustion gases will, due to moisture recirculation, exceed the maximum even up to 80° C. flue gas temperature, whereby condensation will occur. Without moisture recirculation the moisture content in the furnace is constant because the outgoing moisture flow is the same as the chemically formed moisture flow. By recirculating moisture, the moisture content in the furnace will rise and thus also the outgoing moisture flow. Due to the rising vapour pressure difference the returned moisture flow will likewise begin to increase whereby the moisture content of the furnace rises further. It is easily appreciated that the moisture content of the furnace will approach exponentially a determined final value which is reached when the difference in outgoing and ingoing moisture flow is the same as the chemically formed moisture flow. This final value will only be reached, however, if at the prevailing water return temperature the relative humidity of the outgoing flue gases remains below 100%. A simple example shows that this is not however the case, even at 80° C. flue gas temperature.

EXAMPLE

Conditions:
 moisture recirculation 90%
 gas supply 1 m³/h
 air excess 1.27
 moisture content combustion air 0%
 temperature flue gas and combustion air 80° C.
 RH combustion air 0%
 RH flue gas before module 100% or 48 kPa at 80° C.
 chemically formed water vapour 1.684 m³/h
Calculated values:
air flow rate before exchanger:
 10.71 m³/h, no water vapour
air flow rate after exchanger:
 18.65 m³/h, 7.94 m³/h water vapour at 42.6 kPa
flue gas flow rate before exchanger:
 18.98 m³/h, 8.99 m³/h water vapour at 48 kPa
flue gas flow rate after exchanger:
 11.04 m³/h, 1.05 m³/h water vapour at 9.6 kPa
It can be seen from this table that the difference in ingoing/outgoing moisture flow equals 8.99 m³/h−7.94 m³/h=1.05 m³/h. This is smaller than the chemically formed water vapour flow of 1.684 m³/h. The difference of 0.634 m³/h or 37.6% is thus separated off as condensate flow. This implies a rise in efficiency by 0.376×9.5%=3.6%.

In similar manner the condensate flow for other flue gas temperatures and air excesses can be calculated as a percentage of the chemically formed water vapour. The results of isothermic flue gas moisture recirculation are shown in FIG. 1. At temperatures slightly above 80° C. the condensation is found to have decreased to zero: with moisture recirculation the dew-point of the flue gases has risen from 53° C. to about 82° C. Also shown in FIG. 1 on the right-hand vertical axis is the gain in recovered latent heat as a percentage of the chemically formed water compared to HE furnaces without moisture recirculation. There occurs an asymmetrical curve with a maximum gain of about 96% at the original dew-point of 53° C. where HE furnaces stop condensing. Even at 80° C. flue gas temperature, 38% is still separated.

The figure takes no account of the fact that the situation under partial load is even more favourable due to the over-dimensioning of the module. Under partial load conditions wherein the flow rates and the flue gas temperatures are lower, the degree of humidification will rise above 90% and the condensate flows will be higher.

In mains water heating, wherein as a result of the high flue gas temperatures at full load conditions and high furnace water temperatures without moisture recirculation, condensation never occurs, the condensate flow increase according to FIG. 1 is always large. Through an absolute decrease of the sensible losses (120° C. to 80° C.) by 2% and through an absolute decrease of the latent losses by 4 to 5% the mains water efficiency can therefore rise in total by 7%.

FIG. 1 assumes an ambient air with a relative humidity of 0%. If air at 20° C. and 50% RH is drawn in for instance from the dwelling, the dew-point then rises without moisture recirculation from 53° C. to 54.7° C. The moisture content of the combustion air rises by about 7.4%. The HE furnace will at the same flue gas temperature below 53° C. separate all this additional moisture so that below 53° C. an efficiency gain of about 0.7% is achieved at any flue gas temperature. This effect also occurs with moisture recirculation, but now up to the dew-point of 82° C., but to a much lesser extent and increasingly less as the moisture transfer proceeds better. At a constant assumed moisture transfer efficiency of for instance 90% only 10% of the already present moisture content of the combustion air will be separated as condensate, at 80% efficiency 20% will be separated and so on.

The utilization of already present moisture in the intake air over the whole temperature range through which the installation operates makes advantageous the utilization of the latent enthalpy of low temperature moisture sources during application of moisture recirculation. This applies to both room area heating in the winter and mains water heating in the winter and in the summer when the moisture content of outside air is several times higher than in the winter. Particularly in the case of mains water heating with flue gas temperatures in the vicinity of 80° C., wherein according to FIG. 1 there is a strong variation in the condensate flow, increase of the dew-point by several degrees is very important. In addition to condensation of ambient moisture, in particular the separation of the chemically formed moisture also rises by of tens of percent. It can also be seen from the figure that the smallest possible air excess is herein very favourable.

As ambient moisture sources, in addition to outside air, which can be combined advantageously with the moisture recirculation system can be mentioned:
 pre-humidified air and pre-heated outside air. The humidifying/heating system can be a sunlight collector with external heat supply or a ground heat and moisture exchanger;

warm and moist ventilation air from dwellings and buildings;

warm and moist air from processes such as for instance used steam.

With moisture recirculation the temperature of the outgoing flue gas can lie just above the return water temperature as a result of the greater air flow rates and the improved heat transfer in the furnace due to heat radiation and condensation. The decrease in the flue gas temperatures from for instance 120° C. to 80° C. produces a further increase in the efficiency of about 2 percent points. Since it was assumed that the exchanger simultaneously transfers heat in addition to moisture, the flue gas temperature after the heat exchanger will also have fallen to for instance 20° C. above ambient temperature. The total efficiency can rise in this manner to above 98%. If herein condensation occurs either in the flue gas duct or in the combustion air the condensation heat will still contribute partially to the further heating of the combustion air, respectively to an increase in the efficiency.

In simultaneous exchange of moisture and heat the temperature differences between flue gas and combustion air must be smaller to better the moisture exchange proceeds, in order to prevent premature condensation occurring. At a moisture transfer efficiency of for instance 90%, the temperature difference between both mass flows may not amount at any location to more than about 2° C.

The radiation losses, which in a well designed HE furnace amount to roughly 0.5%, will likewise decrease with moisture recirculation due to the lower temperatures in the combustion space.

The result of the stated effects is that with moisture recirculation by simultaneous moisture and heat exchange the sensible flue gas side losses with ambient air as combustion air can be reduced to roughly 1% (flue gas 20° C. above the ambient air) and the latent losses likewise to about 1%. With about 0.5% radiation loss a gas-side efficiency of 97.5% is thus possible related to the upper calorific value of natural gas. When additional "free" moisture sources in the environment are utilized the efficiency can be further increased, eventually to above 100%. The efficiency improvement is relatively the largest for mains water heating since this also involves a considerable rise in the chemically formed condensate.

Due to the drying action of the exchanger the problem of the condensation plume into the environment will be greatly reduced and, at lower flue gas temperatures, even disappear completely. The criterion herefor is whether the connecting line between two points in the Mollier diagram, wherein the one point represents the moisture condition of the flue gas and the other the moisture condition of the ambient air, lies partly in the mist range below the saturation curve. The greater the part lying in the mist range, the greater the chance of condensation plume formation. At for instance an air excess of 1.27, 90% humidifying of the combustion air and a flue gas temperature of 60° C., the moisture content of the outgoing flue gas is only 7.5% RH and moisture cannot occur at any outside air condition, even after cooling of the flue gas in the exchanger to for instance 20° C., wherein the RH rises to about 50%.

A favourable effect on the $NO_x$ also occurs. It can be seen from the table that the flue gas flow rate prior to the heat exchanger amounts to 18.98 $m^3$/h. in stoichiometric conditions and without moisture recirculation this is only 9.39 $m^3$/h, or 50%. The theoretical flame temperatures will hereby fall from about 2000° C. to 1400° C., whereby the $NO_x$ production will decrease. This is comparable to the decrease in $NO_x$ when the air excess rises. Because at flue gas temperatures below 80° C. condensate always occurs, the $NO_2$ portion will decrease still further due to absorption by water.

Flue gas moisture recirculation also wholly or partially obviates the other drawbacks such as the dependence on the design of the heat distribution system, the expensive chimney ducts, the limited placing options, the disturbing condensation plume and the danger of ice formation. In order to be able to embody the invention it is thus necessary to have available equipment which selectively extracts water vapour from the exhaust gas flow and feeds this to the intake air and which therein also provides beforehand or simultaneously the necessary heating of the intake air.

Reference is now made to FIGS. 4, 5, 6 and 7. In the embodiments shown therein use is made of so-called membranes. Using membrane separating processes having as driving force the difference in water vapour pressure, it is possible to selectively extract water vapour from the flue gas flow and relinquish it to the intake air flow. The enormous contact surface formed by thin membrane walls as separating medium also enables a good heat exchange.

An embodiment of the exchanger for performing the said method makes use of gas separating membranes. These are non-porous polymer membranes which can have a very high permeability for particular gases, while other gaseous components in the gas flow are not, or practically not, allowed through. In order to perform the said method a polymer must be selected with a high permeability for water vapour. Use is preferably made herein of polydimethylsiloxane for the gas separation applied to polysulphon as microporous carrier and formed to hollow fibres. FIG. 5 shows a possible embodiment. It is the object to place the flue gas flow and the combustion feed air into direct contact with each other in counterflow in a membrane module with a gas separating membrane as separating wall. Under the influence of the vapour pressure difference as driving force the water vapour from the flue gas flow is transported by means of dissolving and diffusion in the gas separating membrane to the side of the combustion air feed and carried to the heating device. Condensation of the water vapour in the flue gas flow respectively the combustion air flow can occur at higher flue gas temperatures. This can be prevented by preheating the combustion air. It has been found from experiments with the said material that the matter transfer coefficient for water vapour in moist and dry air flows which exchange moisture in counterflow does not vary significantly with a variation of the temperature and the relative humidity of the air. This is a great advantage in dimensioning the exchanger in different temperature and moisture conditions.

Figure 6:
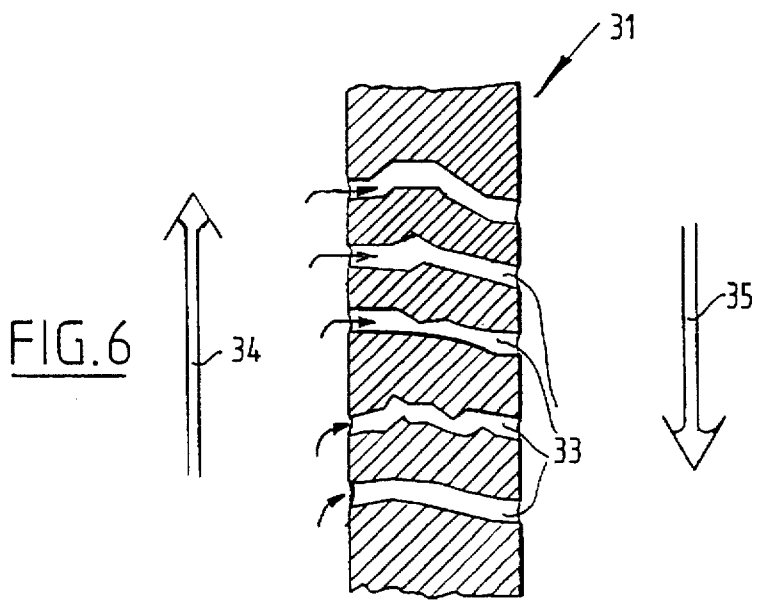
FIG. 6 is a greatly simplified schematic view on very large scale of a gas absorption membrane.
Figure 4:
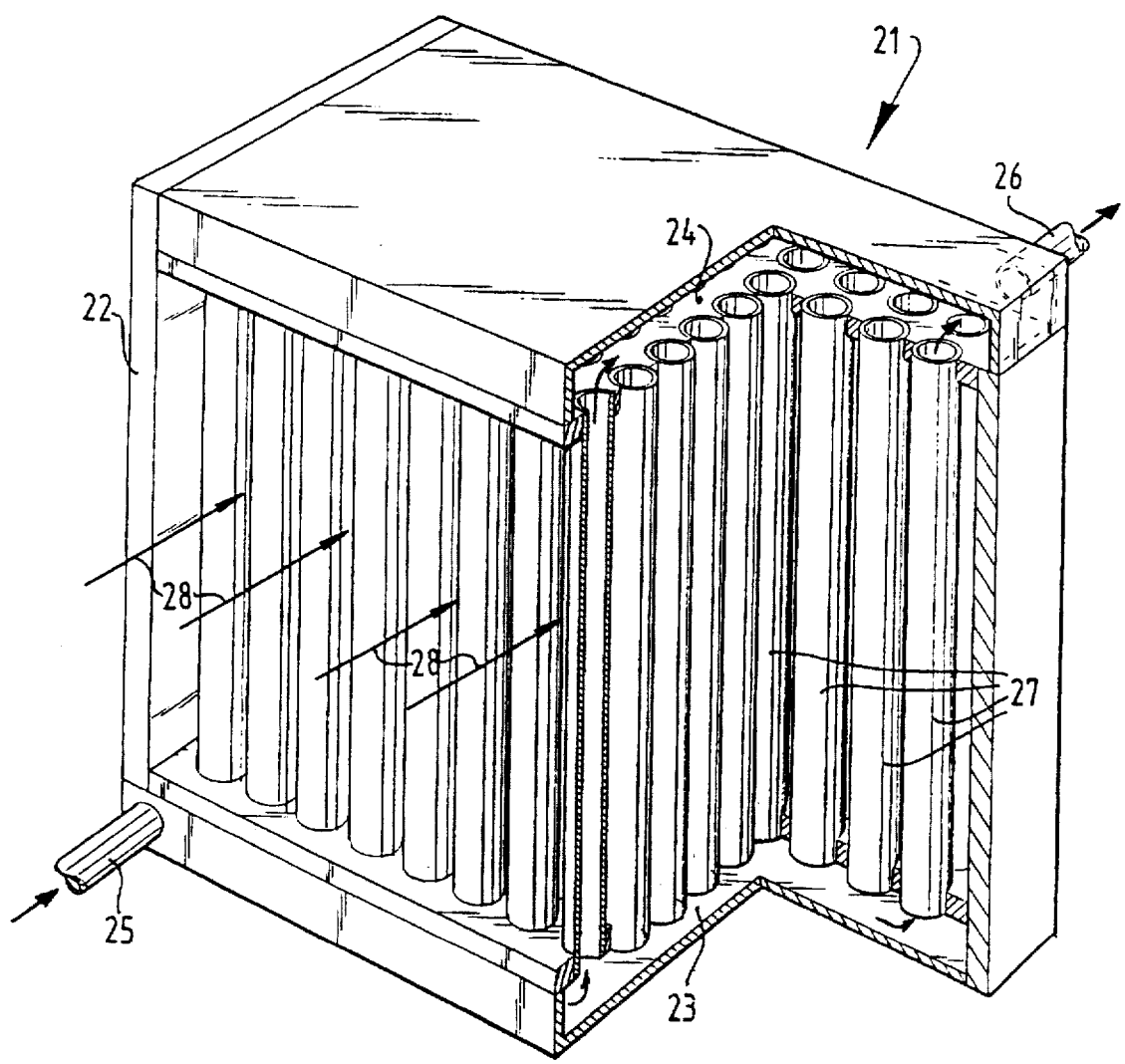
FIG. 4 shows a partly broken away perspective view of a membrane module which can serve to transport moisture from the flue gases to the incoming ambient air in the apparatus according to FIG. 3.

The embodiment according to FIG. 4 makes use of two transversely approached hollow-fibre membrane modules with gas absorption membranes manufactured from a large number of thin, hollow, microporous hydrophobic polymer fibres. Polypropylene, polyimide or polyethersulphon is preferably used for this purpose. The module 21 shown in FIG. 4 comprises a housing 22 with two end spaces 23, 24 which are respectively connected to a flue gas intake 25 and a flue gas discharge 26. The spaces 23 and 24 are mutually connected via tubular membranes 27. The through-flow of ambient air is drawn with arrows 28. This ambient air flows along the membranes 27 and can thus carry with it the water vapour transported therethrough extracted from the flue gases, as shown as 19 in FIG. 3. Both for the intake air flow and the outlet air flow a membrane module is optionally provided with different dimensions. The fibres are approached transversely by the air flow. Flowing through the fibres as absorbent is a watery liquid with hygroscopic properties. The microporous membrane wall serves as separating medium between the liquid and the air and is permeable for gases but not for the liquid and has a vapour pressure for water vapour lying between the vapour pressures of the intake air and the outlet air. In preference ethylene glycols or a brining liquid can be used as hygroscopic liquid. The hygroscopic liquid circulates between both modules, wherein, in counterflow to the air flow, moisture is extracted from the outlet air and relinquished to the inlet air. Reference is made to FIGS. 6 and 7.

FIG. 6 shows schematically a micro-view of a gas absorption membrane. This membrane 31 can transport moisture from gas passing by as according to arrow 34 via continuous openings 33 and deliver it to an absorbing agent flowing past on the other side as according to arrow 35.

FIG. 7 shows the arrangement schematically. The moisture-absorbing and also heat transferring medium circulates in the circuit 36, 37. The flue gases and the outside air are designated respectively 17 and 9 as according to FIG. 3.

During the absorption process of the water vapour by the absorbent, the heat of evaporation is converted into absorption heat which is distributed through the air and the absorbent depending on the respective mass flow rates. The effect is that both mass flows are increased in temperature. When the mass flows for liquid and air are roughly equal and at a specific heat of the absorbent which is about 1000× greater than for air, the temperature increase of the outgoing outlet air is limited to a few degrees, while that of the absorbent can rise to more than 10° C. depending on the water content of the absorbent. Practically all condensation heat will then be released to the absorbent. In the second module the absorbent subsequently relinquishes water vapour to the dry intake air by means of desorption and cools again herein to the outlet air temperature. Pre-heating of the intake air can take place if desired by embodying the first part of the desorption module with non-porous membrane fibres. In the case of insufficient desorption further heating of the absorbent can be realized if desired with the heating installation, for instance by heat exchange with the feed conduit to the water distribution system. During absorption the vapour pressure of the absorbent lies, depending on the water content, at 7 to 12 kPa (water content 9% respectively 19%) at a vapour pressure in the air flow of 20 kPa. The vapour pressure difference is thus in the order of 10 kPa. It has been found from earlier tests with a module of 400 $cm^2$ that the moisture transport at a vapour pressure difference of 10 kPa amounts to about 3.7 mg/s and that with fibres with enhanced matter transfer properties at least double this, or 6.4 mg/s, is possible. In the above stated example of a 20 kW heating installation the moisture flow for discharging amounts to 0.84 g/s (corresponding with about 2 kW power). A 130 times larger module, or a module of about 5 $m^2$, is thus necessary for this purpose.

This new principle of heat recovery by flue gas moisture recirculation combined with sensible heat recovery in an exchanger can in principle be applied to all types of energy generating installations for heat, cold or heat/power combined and fired with fossil fuel or with biogas and equipped with a flue gas heat exchanger and irrespective of the power. FIG. 8 shows as example the schematic diagram of a heat/power installation for combined generation of heat and power. Via a fan 41 outside air is drawn in via the water vapour exchanger 18 and supplied in pre-heated and humidified state to a combustion motor 42 which also receives gas via a gas feed conduit 43. This combustion motor 42, which can be embodied as gas motor, gas turbine, hot air motor or other suitable motor, converts the supplied energy partly into mechanical energy and partly into heat. The mechanical energy is taken off via shaft 47 and fed for instance to a generator for generating electricity or to a compressor of a cooling or heat pump installation. The heat comes from the motor cooling and from the flue gases of the combustion motor and is fed to for instance a central heating system 48. The flue gas heat exchanger 46 provides cooling of the flue gases. Via a so-called "eco" 46, flue gases 17 are guided along the moisture exchanger 18 and are then discharged. The moisture recirculation will again result in a greatly increased moisture content of the combustion air and therefore to a greatly increased dew-point. Via the "eco" or flue gas condenser 46 the condensate is separated off in the same manner as described above for HE central heating installations. The above mentioned moist air flows 49 coming from elsewhere in the environment can also be fed to the combustion air to further increase the dew-point temperature and the condensate flow. It makes no difference herein in particular whether the power generating unit makes use of external combustion, such as for instance in steam furnaces, absorption cooling machines or heat pumps or Stirling machines, or of internal combustion such as in for instance gas motors or gas turbines. It is known that the $NO_x$ emission in gas motors and gas turbines can be reduced by decreasing the combustion temperatures using water or steam injection. This effect can likewise be achieved using the principle of flue gas moisture recirculation without adding water externally but by making use of chemically formed water. Thus created is a kind of dry "low $NO_x$" burner. Particularly in the case of gas turbines, which are very sensitive to contaminants in the water due to possible calcium precipitation on the turbine blades, where a very large investment is entailed in demineralizing the feed water. Using moisture recirculation the desired humidifying is provided by the chemically formed, clean and free water vapour from the energy generating installation itself. The use of membranes as moisture/heat exchanger for instance prevents recirculation of particles from the flue gas flow as a result of the specific separating process.

Finally, it is possible to combine the exchanger for moisture recirculation and heat recovery with that of flue gas washer to further purify the flue gases of $NO_x$ and/or $SO_2$. Use can advantageously be made herein of the above described microporous polymeric and hydrophobic gas absorption membranes as so-called membrane stripper. The absorbent must then contain in addition to a moisture absorbing agent components which specifically remove $NO_x$ and $SO_2$.

With respect to oil or coal-fired installations it will be apparent that cooling of the flue gases to below 80° C. implies that the dew-point of $SO_2$ of 160° C. is also not attained. The economiser or flue gas condenser will of course have to be suitable for this purpose.

The share of latent energy of the chemically formed water vapour, in the total released energy during combustion of fossil fuels or biogas formed from organic waste, forms the difference between the upper calorific value or combustion efficiency and the lower calorific value or net heating value of the relevant fuel. Broadly speaking, this difference is 10% in the case of natural gas and biogas, 6% in the case of oil and 3% in the case of coal.

I claim:

1. An apparatus for burning fossil fuel, which apparatus comprises:

combustion means for burning the fuel;

converting means for converting the in energy produced in the combustion into a desired form of energy;

a supply conduit for combustion air;

a discharge conduit for flue gases; and a water vapour exchanging system having a membrane, wherein the supply conduit for combustion air and the discharge conduit for flue gases are mutually communicating via the membrane in the water vapour exchanging system such that at least a part of the water vapour present in the flue gases is transferred to the incoming combustion air, with a vapour pressure difference between the flue gases and combustion air acting as a driving force for water vapour exchange, wherein the membrane is a gas separating membrane having a gas separating layer facing the flue gases, and wherein the water vapour exchanging system is also adapted for exchanging heat between the combustion air and the flue gases.

2. The apparatus as claimed in claim 1, wherein the gas separating layer includes polydimethylsiloxane.

3. An apparatus for burning fossil fuel, which apparatus comprises:

combustion means for burning the fuel;

converting means for converting the energy produced in the combustion into a desired form of energy;

a supply conduit for combustion air;

a discharge conduit for flue gases; and a water vapour exchanging system having a membrane, wherein the supply conduit for combustion air and the discharge conduit for flue gases are mutually communicating via the membrane in the water vapour exchanging system such that at least a part of the water vapour present in the flue gases is transferred to the incoming combustion air, with a vapour pressure difference between the flue gases and combustion air acting as a driving force for water vapour exchange, wherein the membrane is a gas separating membrane having a gas separating layer facing the flue gases, wherein the water vapour exchanging system is also adapted for exchanging heat between the combustion air and the flue gases; and wherein the gas separating layer is applied to a microporous carrier including a polysulfon.

4. The apparatus as claimed in claim 1, wherein additional humidified combustion air is fed to the water vapour exchanging system.

* * * * *